(12) United States Patent
Iwasawa

(10) Patent No.: US 7,248,293 B2
(45) Date of Patent: Jul. 24, 2007

(54) IMAGE-SENSING APPARATUS HAVING A ZOOM LENS SYSTEM THAT FOLDS AN OPTICAL PATH

(75) Inventor: Yoshito Iwasawa, Setagaya-Ku (JP)

(73) Assignee: Minolta Co., Ltd., Osaka (JP)

( * ) Notice: Subject to any disclaimer, the term of this patent is extended or adjusted under 35 U.S.C. 154(b) by 737 days.

(21) Appl. No.: 10/390,360

(22) Filed: Mar. 17, 2003

(65) Prior Publication Data

US 2004/0105020 A1    Jun. 3, 2004

(30) Foreign Application Priority Data

Dec. 2, 2002    (JP)    ............... 2002-350208

(51) Int. Cl.
    *H04N 5/262*    (2006.01)
(52) U.S. Cl. ............... 348/240.3; 348/340; 348/374; 359/354; 359/372; 359/676; 359/684
(58) Field of Classification Search ............ 348/240.3, 348/340, 373, 374, 376; 359/354, 372, 676, 359/684, 687
    See application file for complete search history.

(56) References Cited

U.S. PATENT DOCUMENTS 4,249,798 A *    2/1981    Moskovich ............... 359/683

(Continued)

FOREIGN PATENT DOCUMENTS

EP    0 906 587 B1    9/2002

(Continued)

OTHER PUBLICATIONS

U.S. Appl. No. 10/611,016, filed Jul. 1, 2003, Iwasawa et al.

*Primary Examiner*—Vivek Srivastava
*Assistant Examiner*—Chriss S. Yoder
(74) *Attorney, Agent, or Firm*—Sidley Austin LLP

(57)    ABSTRACT

An image-sensing apparatus has a zoom lens system for forming an optical image of an object with variable magnification, which zoom lens system includes a plurality of lens units and achieves zooming by varying distances between the lens units, and an image sensor for converting the optical image formed by the zoom lens system into an electrical signal. The zoom lens system has, from the object side, a first lens unit that has a positive optical power, includes a reflective member for turning the optical path, and is kept stationary relative to the image sensor during zooming, a second lens unit that is disposed on the image side of the first lens unit and has a negative optical power, an aperture stop that is disposed on the image side of the second lens unit and is kept stationary relative to the image sensor during zooming, and at least one lens unit that is disposed on the image side of the aperture stop and is moved relative to the image sensor during zooming.

4 Claims, 6 Drawing Sheets

U.S. PATENT DOCUMENTS

| | | | |
|---|---|---|---|
| 5,305,148 A * | 4/1994 | Ikemori et al. | 359/689 |
| 5,448,319 A | 9/1995 | Uzawa | 354/81 |
| 5,583,697 A * | 12/1996 | Mukaiya | 359/687 |
| 6,016,228 A * | 1/2000 | Uzawa | 359/687 |
| 6,104,432 A | 8/2000 | Nakamura et al. | 348/360 |
| 6,104,537 A * | 8/2000 | Togino | 359/629 |
| 6,185,048 B1 * | 2/2001 | Ishii et al. | 359/687 |
| 6,542,316 B2 * | 4/2003 | Yoneyama | 359/749 |
| 6,829,011 B1 * | 12/2004 | Higuchi et al. | 348/340 |
| 6,850,279 B1 * | 2/2005 | Scherling | 348/335 |
| 2002/0060855 A1 * | 5/2002 | Ohashi | 359/684 |
| 2002/0136150 A1 | 9/2002 | Mihara et al. | 369/125 |
| 2003/0202257 A1 * | 10/2003 | Uzawa et al. | 359/685 |
| 2003/0202258 A1 * | 10/2003 | Hozumi et al. | 359/687 |

FOREIGN PATENT DOCUMENTS

| | | |
|---|---|---|
| JP | 8-248318 A | 9/1996 |
| JP | 11-196303 A | 7/1999 |
| JP | 11-258678 A | 9/1999 |
| JP | 2000-131610 A | 5/2000 |

* cited by examiner

FNO=2.80

— d
--- g
-·- c
---- SC

-0.1　0.1
SPHERICAL SINE
ABERRATION CONDITION

Y'=2.8

--- DM
— DS

-0.1　0.1
ASTIGMATISM

Y'=2.8

-5.0　5.0
DISTORTION %

FNO=3.43

— d
--- g
-·- c
---- SC

-0.1　0.1
SPHERICAL SINE
ABERRATION CONDITION

Y'=2.8

--- DM
— DS

-0.1　0.1
ASTIGMATISM

Y'=2.8

-5.0　5.0
DISTORTION %

FNO=3.70

— d
--- g
-·- c
---- SC

-0.1　0.1
SPHERICAL SINE
ABERRATION CONDITION

Y'=2.8

--- DM
— DS

-0.1　0.1
ASTIGMATISM

Y'=2.8

-5.0　5.0
DISTORTION %

FNO=2.80

SPHERICAL   SINE
ABERRATION  CONDITION

Y'=2.8

ASTIGMATISM

Y'=2.8

DISTORTION %

FNO=3.38

SPHERICAL   SINE
ABERRATION  CONDITION

Y'=2.8

ASTIGMATISM

Y'=2.8

DISTORTION %

FNO=3.70

SPHERICAL   SINE
ABERRATION  CONDITION

Y'=2.8

ASTIGMATISM

Y'=2.8

DISTORTION %

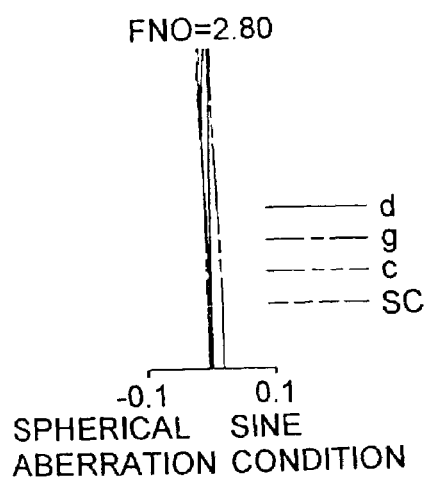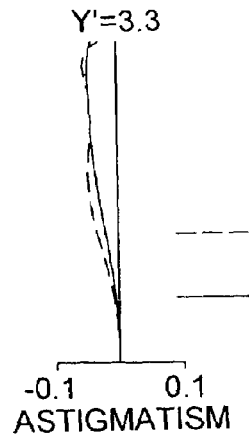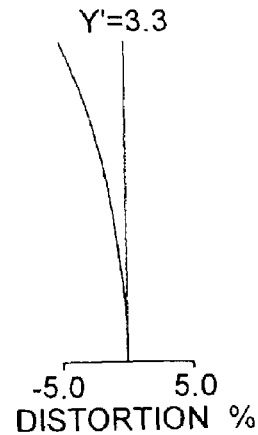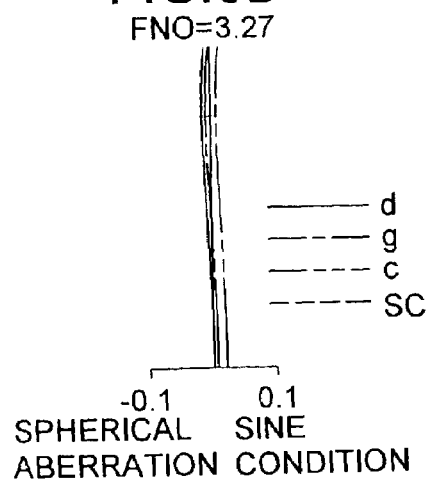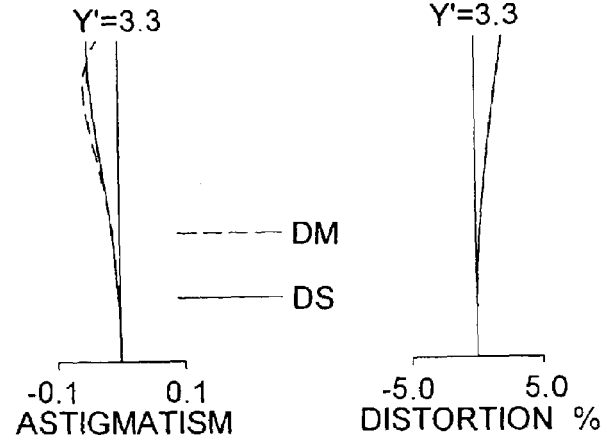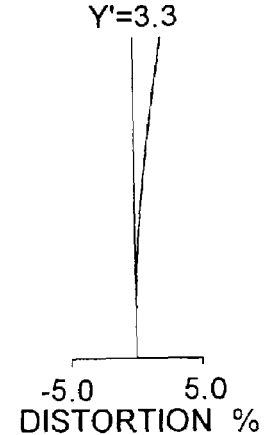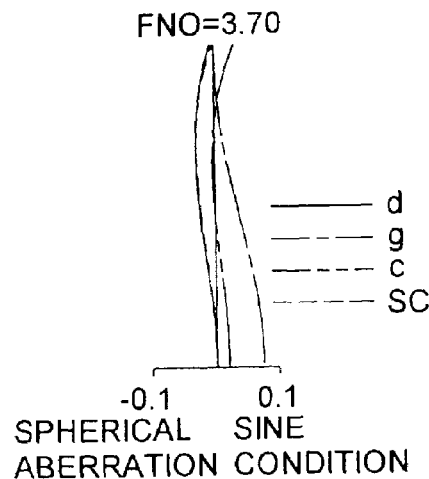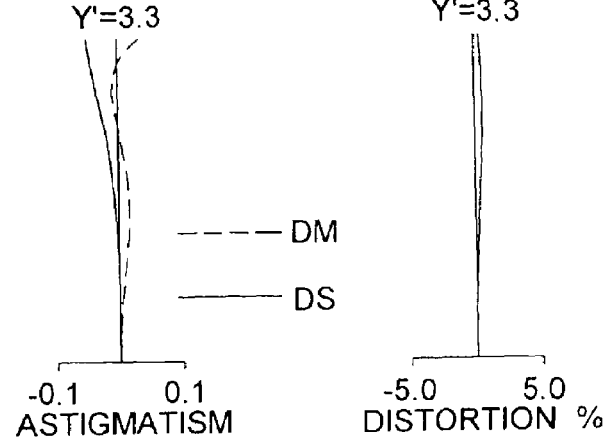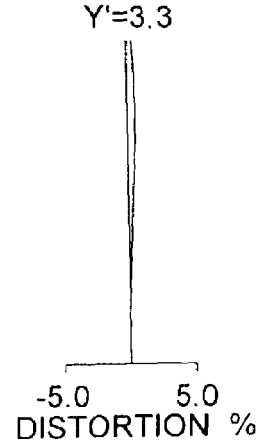

IMAGE-SENSING APPARATUS HAVING A ZOOM LENS SYSTEM THAT FOLDS AN OPTICAL PATH

This application is based on Japanese Patent Application No. 2002-350208 filed on Dec. 2, 2002, the contents of which are hereby incorporated by reference.

BACKGROUND OF THE INVENTION

1. Field of the Invention

The present invention relates to an image-sensing apparatus. More specifically, the present invention relates to an image-sensing apparatus (a main component of a digital camera, video camera, or camera incorporated in or externally fitted to a digital video unit, personal computer, mobile computer, cellular phone, personal digital assistant (PDA), or the like) that optically takes in an image of a subject through an optical system and that then outputs it in the form of an electrical signal by means of an image sensor, and in particular to an image-sensing apparatus provided with a compact high-zoom-ratio zoom lens system that covers from a wide-angle range to a telephoto range.

2. Description of the Prior Art

In zoom lens systems that cover from a wide-angle range to a telephoto range, high zoom ratios and compactness are eagerly sought. As zoom lens systems of this type, there are conventionally known five-unit zoom lens systems of positive-negative-positive-positive-positive and positive-negative-positive-negative-positive types. In these zoom lens systems, the first lens unit is kept stationary during zooming, and focusing in close-up shooting is achieved by moving the succeeding lens units. This helps avoid excessive enlargement of the front lens diameter. On the other hand, Japanese Patent Application Laid-Open No. H8-2483118 proposes a four-unit zoom lens system of a positive-negative-positive-positive type wherein the optical path is turned with a prism inserted between lenses to make the zoom lens system compact along its optical axis.

In recent years, as image sensors are made increasingly small, further miniaturization has been sought in zoom lens systems. This, however, cannot be achieved with the five-unit zoom constructions mentioned above. On the other hand, the zoom lens system proposed in the patent publication mentioned above has a large number of lenses, and neither its optical performance nor its compactness along the optical axis is satisfactory.

SUMMARY OF THE INVENTION

An object of the present invention is to provide an image-sensing apparatus provided with a compact zoom lens system with a zoom ratio of about 3× which offers satisfactory optical performance over the entire zoom range thereof.

To achieve the above object, according to one aspect of the present invention, an image-sensing apparatus is provided with: a zoom lens system for forming an optical image of an object with variable magnification, which zoom lens system includes a plurality of lens units and achieves zooming by varying the distances between the lens units; and an image sensor for converting the optical image formed by the zoom lens system into an electrical signal. Here, the zoom lens system is provided with, from the object side thereof: a first lens unit that has a positive optical power, includes a reflective member for turning the optical path, and is kept stationary relative to the image sensor during zooming; a second lens unit that is disposed on the image side of the first lens unit and has a negative optical power; an aperture stop that is disposed on the image side of the second lens unit and is kept stationary relative to the image sensor during zooming; and at least one lens unit that is disposed on the image side of the aperture stop and is moved relative to the image sensor during zooming.

According to another aspect of the present invention, an image-sensing apparatus is provided with: a zoom lens system for forming an optical image of an object with variable magnification, which zoom lens system includes a plurality of lens units and achieves zooming by varying the distances between the lens units; and an image sensor for converting the optical image formed by the zoom lens system into an electrical signal. Here, the zoom lens system is provided with, from the object side thereof: a first lens unit that has a positive optical power, includes a reflective member for turning an optical path, and is kept stationary relative to the image sensor during zooming; a second lens unit that is disposed on the image side of the first lens unit and has a negative optical power; a third lens unit that is disposed on the image side of the second lens unit and is moved relative to the image sensor during zooming; and a fourth lens unit that is disposed on the image side of the third lens unit and has a positive optical power.

According to another aspect of the present invention, an image-sensing apparatus is provided with: a zoom lens system for forming an optical image of an object with variable magnification, which zoom lens system includes a plurality of lens units and achieves zooming by varying the distances between the lens units; and an image sensor for converting the optical image formed by the zoom lens system into an electrical signal. Here, the zoom lens system comprises, from the object side thereof: a first lens unit that has a positive optical power, includes a reflective member for turning an optical path, and is kept stationary relative to the image sensor during zooming; a second lens unit that is disposed on the image side of the first lens unit, has a negative optical power, and is moved relative to the image sensor during zooming; a third lens unit disposed on the image side of the second lens unit, has a positive optical power, and is moved relative to the image sensor during zooming; and a fourth lens unit disposed on the image side of the third lens unit and has a positive optical power.

According to another aspect of the present invention, a camera is provided with an image-sensing apparatus for outputting an electric image signal representing an image of an object, and the image-sensing apparatus is constructed as described above.

BRIEF DESCRIPTION OF THE DRAWINGS

This and other objects and features of the present invention will become clear from the following description, taken in conjunction with the preferred embodiments with reference to the accompanying drawings in which:

FIGS. 6A to 6I are aberration diagrams of Example 3; and

DESCRIPTION OF THE PREFERRED EMBODIMENTS

Figure 7:
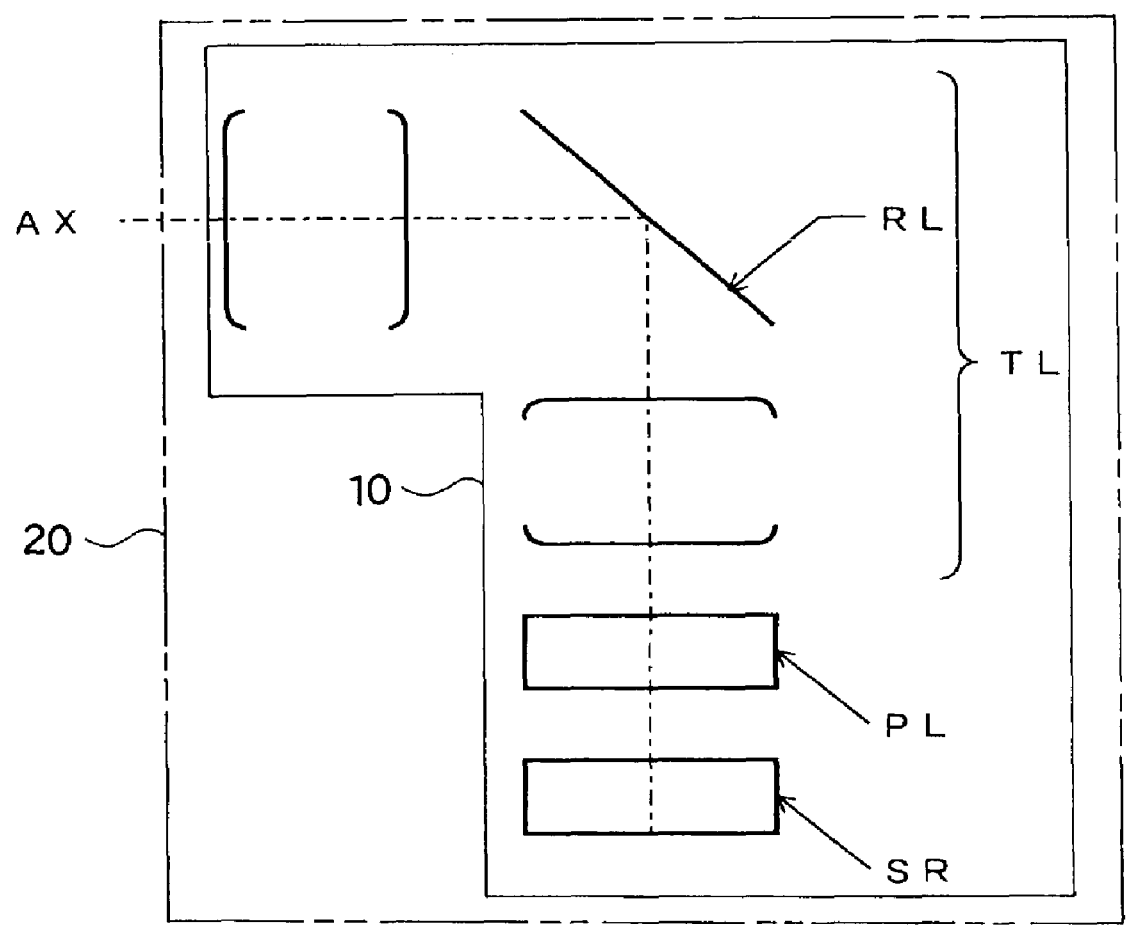
FIG. 7 is a diagram schematically showing an outline of the optical construction of an image-sensing apparatus embodying the invention.

Hereinafter, image-sensing apparatuses embodying the present invention will be described with reference to the drawings. An image-sensing apparatus optically takes in an image of a subject and then outputs it in the form of an electric signal. An image-sensing apparatus is used as a main component of a camera used to take a still or moving picture of a subject (for example, a digital camera, video camera, or camera incorporated in or externally fitted to a digital video unit, personal computer, mobile computer, cellular phone, personal data assistant (PDA), or the like). For example, as shown in FIG. 7, an image-sensing apparatus 10 incorporated in a camera 20 is composed of, from the object (subject) side thereof, a taking lens system TL for forming an optical image of an object, a parallel-surface plate PL acting as an optical low-pass filter or the like, and an image sensor SR for converting the optical image formed by the taking lens system TL into an electrical signal. In the middle of the optical path through the taking lens system TL, a flat reflective surface RL is disposed, and at least one lens element is disposed on each of the front and rear sides of the reflective surface RL. The reflective surface RL turns the optical path so that the taking lens system TL is used as a turning optical system; specifically, it reflects a beam of light so that the optical axis AX is turned by about 90°. Used as the reflective surface RL is a reflective member such as a kind of prism (for example, a rectangular prism) or a kind or mirror (for example, a flat mirror).

In all embodiments of the invention described later, a zoom lens system composed of a plurality of lens units is used as the taking lens system TL, and zooming is achieved by moving a plurality of lens units along the optical axis AX in such a way as to vary the distances between them. Used as the image sensor SR is, for example, a solid-state image sensor such as a CCD (charge-coupled device) or a CMOS (complementary metal-oxide semiconductor) sensor composed of a plurality of pixels. The optical image formed by the zoom lens system is converted into an electrical signal by the image sensor SR.

The optical image to be formed by the zoom lens system passes through the optical low-pass filter having a predetermined cutoff frequency characteristic that depends on the pixel pitch of the image sensor SR, and meanwhile the optical image has its spatial frequency characteristic so adjusted as to minimize so-called aliasing noise generated when the optical image is converted into an electrical signal. Used as the optical low-pass filter is a birefringence-type low-pass filter made of quartz or the like having an appropriately aligned crystal axis, a phase-type low-pass filter that achieves the required optical cut-off frequency characteristics by exploiting diffraction, or a low-pass filter of any other type. The signal produced by the image sensor SR is subjected to predetermined digital image processing, image compression processing, and the like as required, and is recorded in a memory (such as a semiconductor memory or an optical disk) as a digital video signal; in some cases, the signal is transferred to another device through a cable or after being converted into an infrared signal.

In the image-sensing apparatus 10 shown in FIG. 7, the taking lens system TL performs reduction-projection from the subject located on the enlargement side (with a longer conjugate distance) to the image sensor SR located on the reduction side (with a shorter conjugate distance). It is, however, also possible to use instead of the image sensor SR a display device (for example, a liquid crystal display device) that displays a two-dimensional image, and use the taking lens system TL as a projection lens system. In this way, it is possible to realize an image projection apparatus that performs enlargement-projection from the image display surface located on the reduction side to a screen surface located on the enlargement side. That is, the zoom lens systems of the embodiments described below can be suitably used not only as a taking lens system TL but also as a projection lens system.

Figure 1:
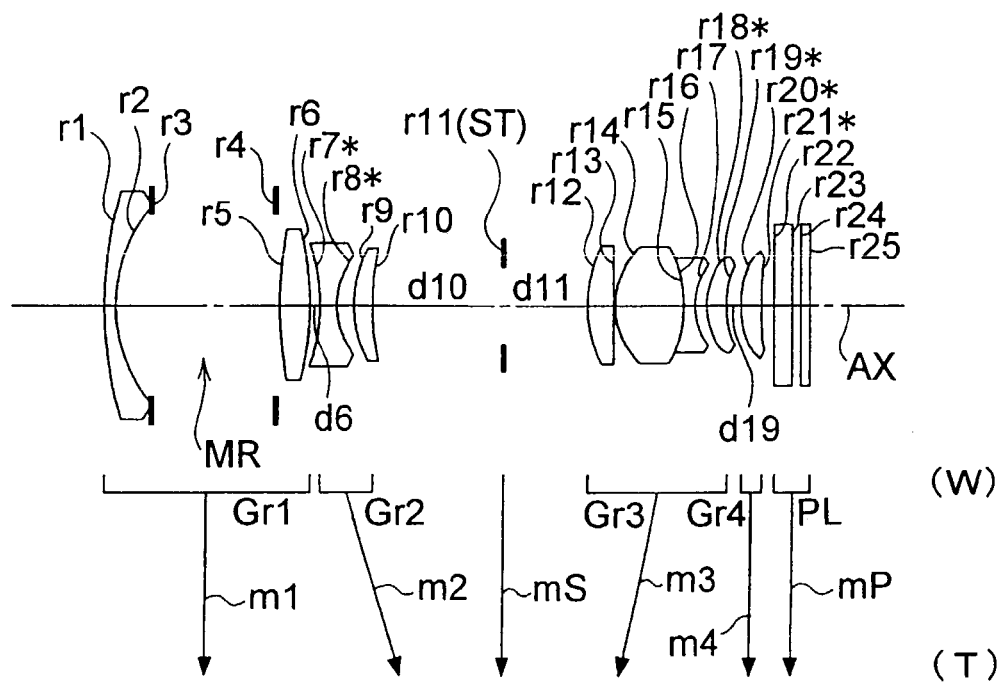
FIG. 1 is a lens construction diagram of a first embodiment (Example 1) of the invention.
Figure 2:
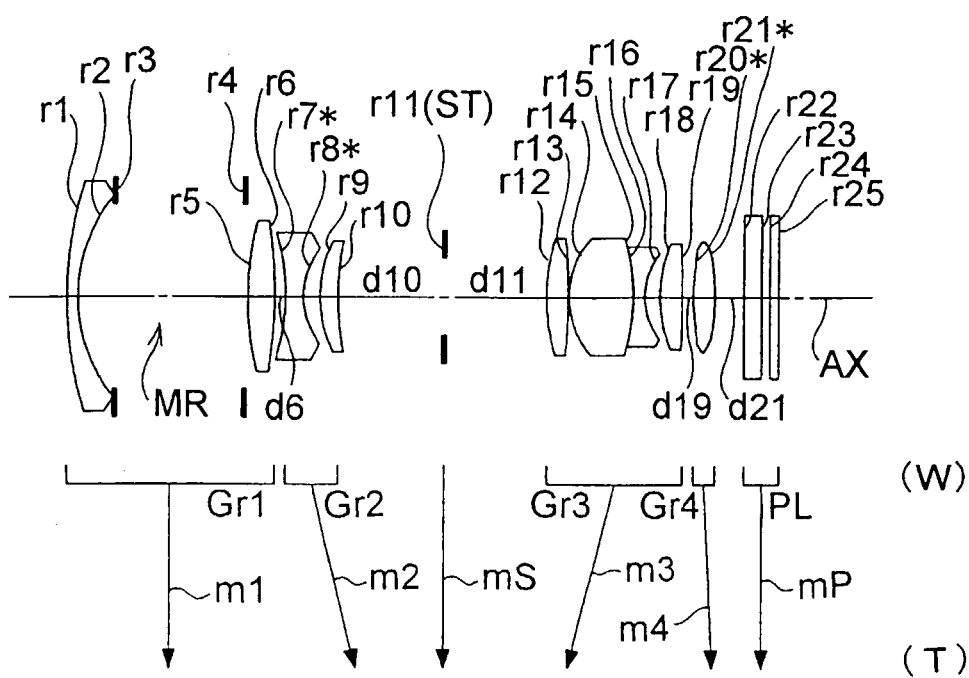
FIG. 2 is a lens construction diagram of a second embodiment (Example 2) of the invention.
Figure 3:
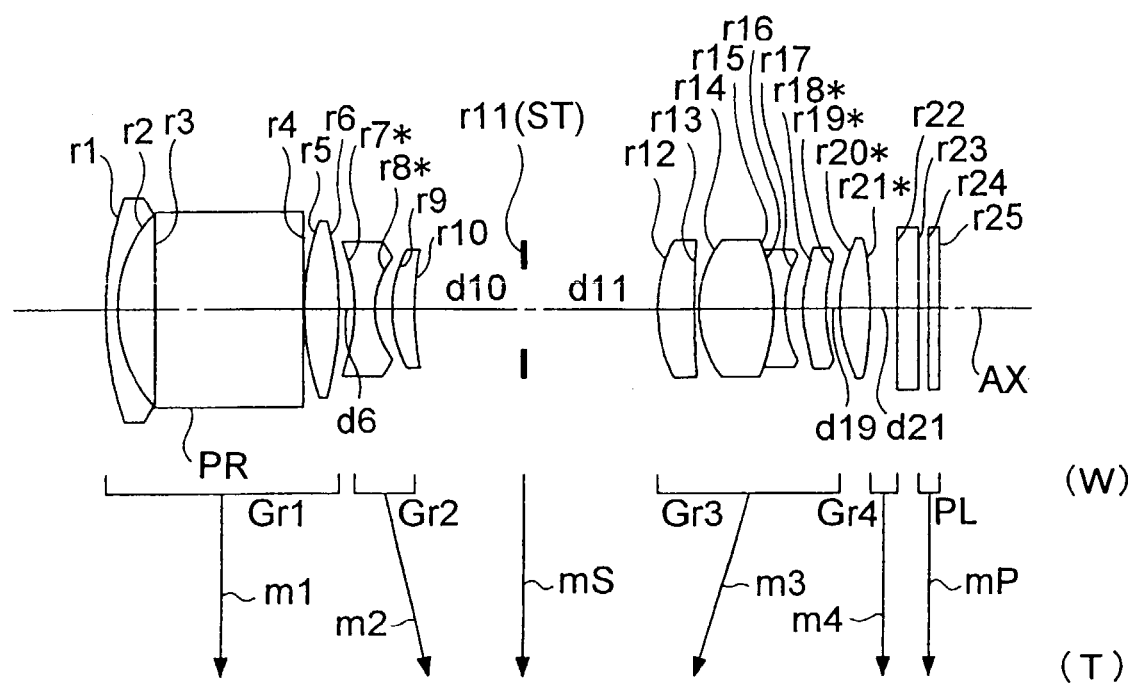
FIG. 3 is a lens construction diagram of a third embodiment (Example 3) of the invention.
Figure 4A:
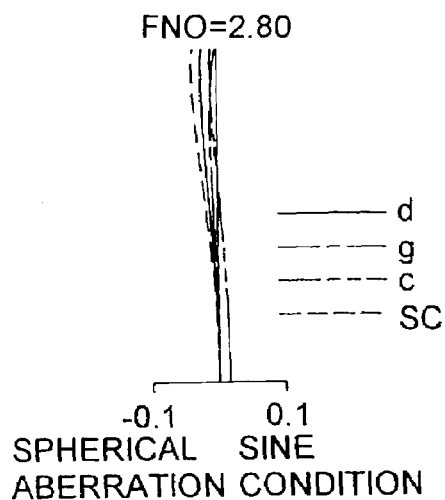
FIGS. 4A to 4I are aberration diagrams of Example 1.
Figure 4B:
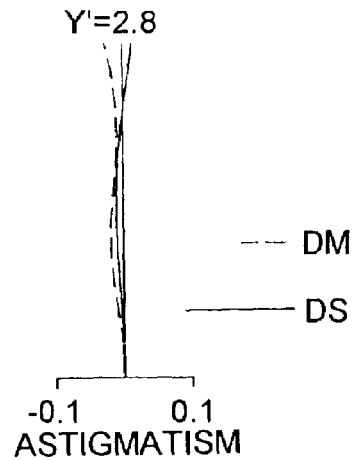
Figure 4C:
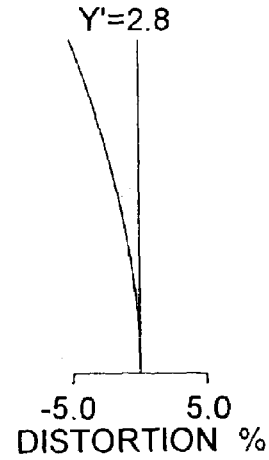
Figure 4D:
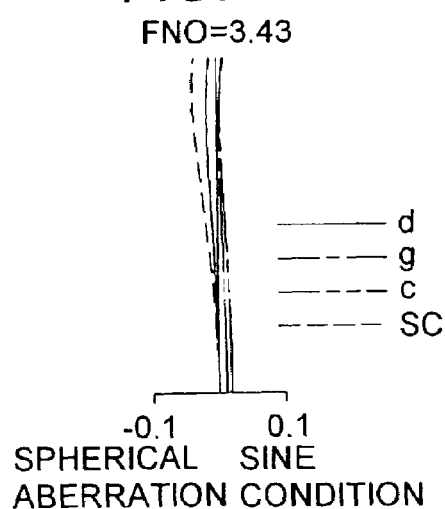
Figure 4E:
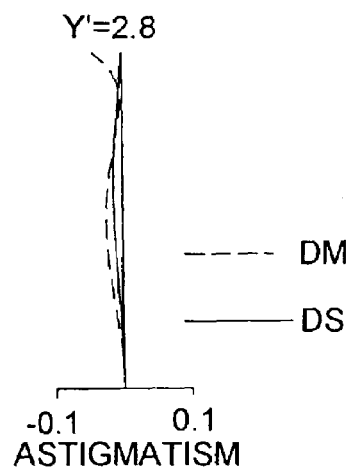
Figure 4F:
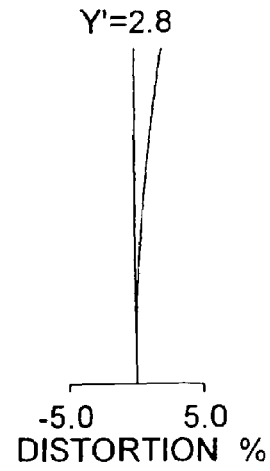
Figure 4G:
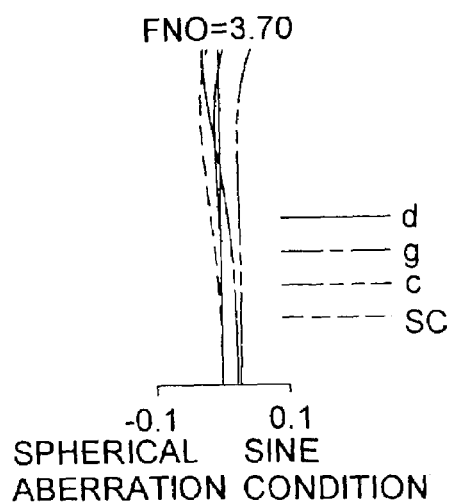
Figure 4H:
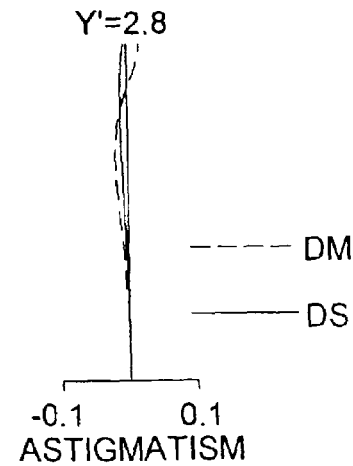
Figure 4I:
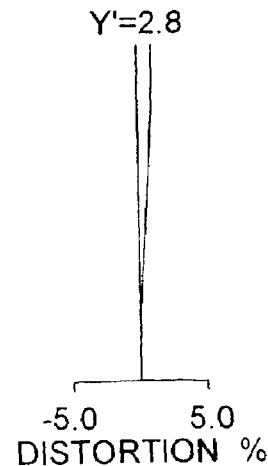
Figure 5A:
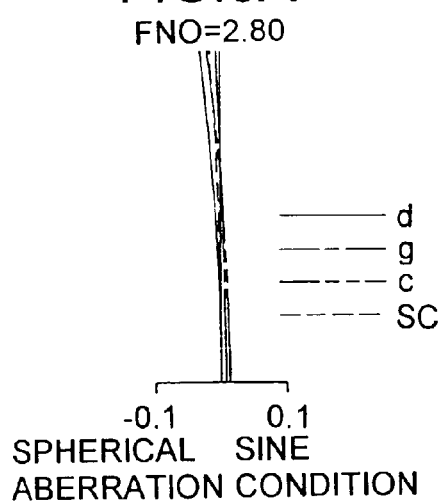
FIGS. 5A to 5I are aberration diagrams of Example 2.
Figure 5B:
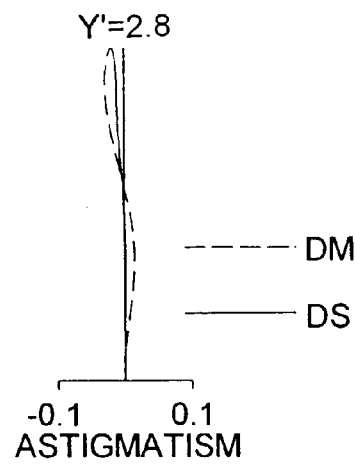
Figure 5C:
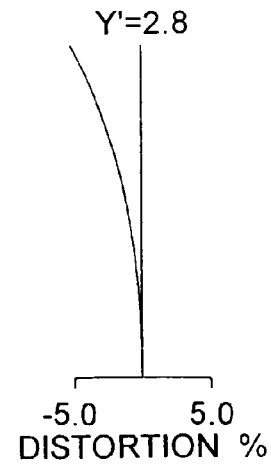
Figure 5D:
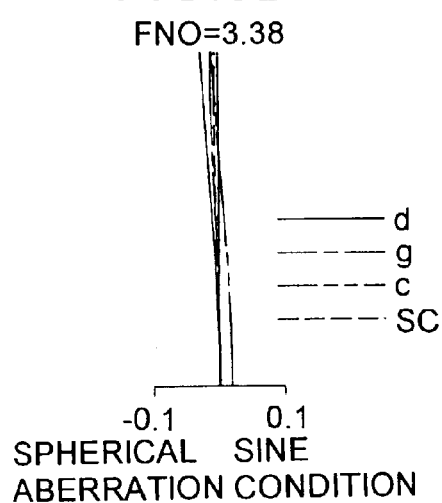
Figure 5E:
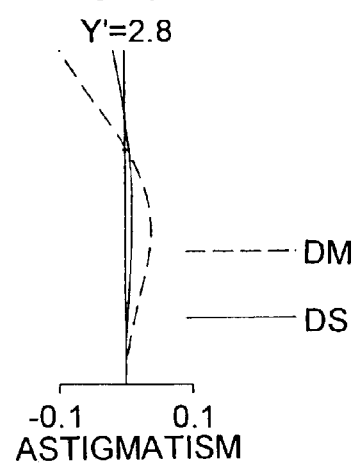
Figure 5F:
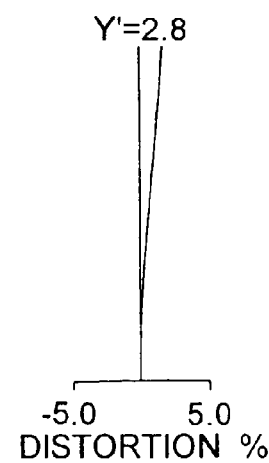
Figure 5G:
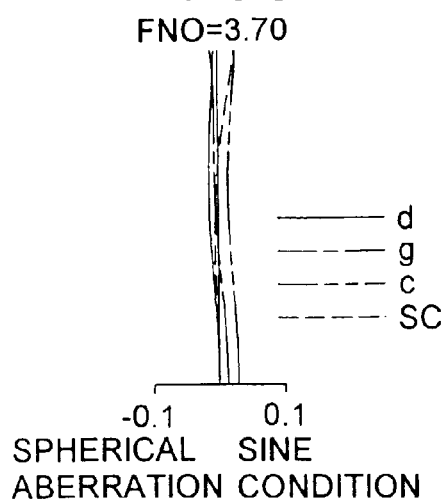
Figure 5H:
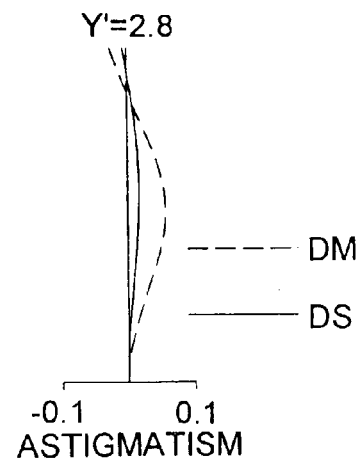
Figure 5I:
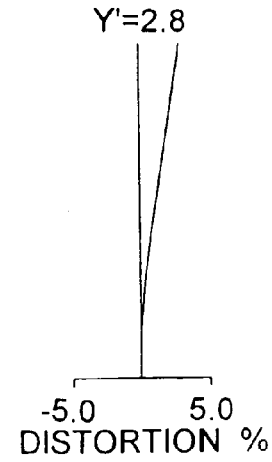

FIGS. 1 to 3 are lens construction diagrams corresponding to the zoom lens systems used respectively in a first to a third embodiment of the invention, each showing the lens arrangement as observed at the wide-angle end W in an optical section. In each lens construction diagram, an arrow mj (j=1, 2, . . . ) schematically indicate the movement of the j-th lens unit Grj during zooming from the wide-angle end W to the telephoto end T, and arrows mS and mP respectively indicate that an aperture stop ST and the parallel-surface plate PL are kept stationary during zooming. In the first embodiment (FIG. 1), the first and fourth lens units Gr1 and Gr4 are stationary lens units, and the second and third lens units Gr2 and Gr3 are movable lens units; in the second and third embodiments (FIGS. 2 and 3), the first lens unit Gr1 is a stationary lens unit, and the second, third, and fourth lens units Gr2, Gr3, and Gr4 are movable lens units. Moreover, in each lens construction diagram, a surface marked as ri (i=1, 2, 3, . . . ) is the i-th surface from the object side, with an asterisk (*) following ri indicating an aspherical surface, and an axial distance marked as di (i=1, 2, 3, . . . ) is the i-th axial distance from the object side, through only those axial distances which vary as zooming is performed, i.e., variable axial distances, are shown here.

In all the embodiments, the zoom lens system is composed of, from the object side thereof, a first lens unit Gr1 having a positive optical power, a second lens unit Gr2 having a negative optical power, a third lens unit Gr3 having a positive optical power, and a fourth lens unit Gr4 having a positive optical power. An aperture stop ST is disposed between the second and third lens units Gr2 and Gr3, and is kept stationary during zooming. The zoom lens system is built as a four-unit zoom lens system that achieves zooming by varying the distances between its constituent lens units. The zoom lens system is used in a camera 20 (for example, a digital camera) provided with an image sensor SR such as a CCD, and therefore has two glass parallel-surface plates PL disposed on the image-surface side thereof. These parallel-surface plates PL correspond to an optical filter such as an optical low-pass filter and to a cover glass plate of the image sensor SR or the like. Now, the lens construction of each embodiment will be described in more detail.

In the first embodiment (FIG. 1), in a four-unit zoom construction of a positive-negative-positive-positive type, each lens unit is constructed, from the object side thereof, as follows. The first lens unit Gr1 is composed of a negative meniscus lens element concave to the image side, a reflective mirror MR having a reflective surface RL (see FIG. 7) for turning the optical axis AX by 90°, and a positive biconvex lens element. The second lens unit Gr2 is composed of a negative biconcave lens element (having aspherical surfaces on both sides) and a positive meniscus lens element convex to the object side. The third lens unit Gr3 is composed of a positive biconvex lens element, a cemented lens element produced by cementing together a positive biconvex lens element and a negative biconcave lens element, and a positive meniscus lens element convex to the object side (having aspherical surfaces on both sides). The fourth lens unit Gr4 is composed of a positive meniscus lens element convex to the object side (having aspherical surfaces on both sides).

In the second embodiment (FIG. 2), in a four-unit zoom construction of a positive-negative-positive-positive type, each lens unit is constructed, from the object side thereof, as follows. The first lens unit Gr1 is composed of a negative meniscus lens element concave to the image side, a reflective mirror MR having a reflective surface RL (see FIG. 7) for turning the optical axis AX by 90°, and a positive biconvex lens element. The second lens unit Gr2 is composed of a negative biconcave lens element (having aspherical surfaces on both sides) and a positive meniscus lens element convex to the object side. The third lens unit Gr3 is composed of a positive biconvex lens element, a cemented lens element produced by cementing together a positive biconvex lens element and a negative biconcave lens element, and a positive biconvex lens element. The fourth lens unit Gr4 is composed of a positive biconvex lens element (having aspherical surfaces on both sides).

In the third embodiment (FIG. 3), in a four-unit zoom construction of a positive-negative-positive-positive type, each lens unit is constructed, from the object side thereof, as follows. The first lens unit Gr1 is composed of a negative meniscus lens element concave to the image side, a rectangular prism PR having a reflective surface RL (see FIG. 7) for turning the optical axis AX by 90°, and a positive biconvex lens element. The second lens unit Gr2 is composed of a negative biconcave lens element (having aspherical surfaces on both sides) and a positive meniscus lens element convex to the object side. The third lens unit Gr3 is composed of a positive meniscus lens element convex to the object side, a cemented lens element produced by cementing together a positive biconvex lens element and a negative biconcave lens element, and a positive meniscus lens element convex to the object side (having aspherical surfaces on both sides). The fourth lens unit Gr4 is composed of a positive biconvex lens element (having aspherical surfaces on both sides).

In any of the embodiments (FIGS. 1 to 3), the zoom lens system is composed of, from the object side thereof, a first lens unit Gr1 including a reflective member (MR or MP) and having a positive optical power, a second lens unit Gr2 having a negative optical power, and at least one movable lens unit (Gr3 and Gr4), with the first lens unit Gr1 kept stationary. This makes it possible to realize a compact zoom lens system with a zoom ratio of about 3× which offers satisfactory optical performance over the entire zoom range thereof. Moreover, by disposing, on the image-surface side of the second lens unit Gr2 (preferably between the second and third lens units Gr2 and Gr3), an aperture stop ST that is kept stationary during zooming from the wide-angle end W to the telephoto end T, it is possible to miniaturize the zoom lens system more effectively. In general, making a single member function both as an aperture stop and as a shutter helps reduce the lowering of peripheral brightness and reduce costs. However, in cases where, as in all the embodiments, higher performance is sought by making the third lens unit Gr3 movable in a zoom construction of a positive-negative-positive-positive type, if the aperture stop ST is made movable together with the third lens unit Gr3, it becomes necessary to move a member as large as a shutter during zooming. This construction, when the structure of the lens barrel is also taken into consideration, makes it difficult to achieve miniaturization. This problem is overcome by keeping the aperture stop ST stationary during zooming as in all the embodiments.

In any of the embodiments, during zooming, the first lens unit Gr1 is kept stationary, and the distances between the lens units are varied by moving at least the third lens unit Gr3 and preferably the second and third lens units Gr2 and Gr3. This helps reduce variation in the total length of the zoom lens system and avoid excessive enlargement of the front lens diameter, and helps make the lens barrel structure simple. Moreover, by disposing a reflective member such as a rectangular prism PR or reflective mirror MR within the first lens unit Gr1, which is kept stationary during zooming, so that the reflective surface RL turns the optical axis AX by 90°, it is possible to make shorter and constant the length along the optical axis AX of the zoom lens system at the entrance side thereof. This helps achieve further miniaturization and a higher zoom ratio than ever. As a result, it is possible to reduce the apparent thickness and size of the camera 20 and thereby realize a camera of which the thickness does not vary as zooming is performed or as the lens barrel is collapsed. As required, another kind of prism or mirror may be used instead of the rectangular prism PR or the reflective mirror MR; the optical axis AX may be turned by any angle other than 90°. Moreover, as required, the reflective surface RL of the reflective member may be given an optical power; the optical axis AX may be turned by the use of a refractive or diffractive surface instead of the reflective surface RL.

In an optical system, like the zoom lens systems of the embodiments, that is built as a turning optical system employing a reflective member such as a reflective mirror MR or rectangular prism PR to turn the optical path, the thickness of the reflective member MR or PR along the optical axis AX greatly affects the dimension of the optical system along the optical axis AX. For this reason, and in addition in order to secure satisfactory optical performance and brightness covering from a wide-angle range to a telephoto range, the reflective member MR or PR needs to be slim. From these viewpoints, in a zoom lens system, like those of the embodiments, in which the optical axis AX is turned inside the first lens unit Gr1 that is kept stationary during zooming, it is preferable that condition (1) below be fulfilled.

$$-8 < fa/fW < -3 \tag{1}$$

where fa represents the composite focal length of all the optical elements disposed on the object side of the reflective member (MR or PR) within the first lens unit (Gr1); and fW represents the focal length of the zoom lens system as a whole at the wide-angle end (W).

Fulfilling condition (1) helps lower the heights at which off-axial rays traveling from the first lens element disposed at the object-side end are incident on the front surface of the reflective member MR or PR, and thus helps avoid increasing the thickness of the reflective member MR or PR as a whole. In particular, in a case where a kind of prism, such as a rectangular prism PR, is used as the reflective member MR or PR, fulfilling condition (1) is effective in making the zoom lens system compact and securing satisfactory brightness.

Moreover, in a lens construction in which the first lens unit Gr1 includes, from the object side, at least one lens element and a reflective member PR or MR, it is preferable that condition (2) below be fulfilled.

$$1.0 < D/fW < 3.0 \tag{2}$$

where

D represents the axial distance from the most object-side surface of the first lens unit (Gr1) to the reflective surface (RL) of the reflective member (PR or MR); and fW represents the focal length of the zoom lens system as a whole at the wide-angle end (W).

Condition (2) defines the condition that needs to be fulfilled by the axial distance from the most object-side surface of the first lens unit Gr1 to the reflective surface RL. In an optical system including a reflective surface RL, fulfilling this condition is essential for miniaturization. If the lower limit of condition (2) is transgressed, the one lens disposed on the object side has a strong optical power. As a result, the first lens unit Gr1 has too strong an optical power, which makes it difficult to correct the negative distortion occurring at the wide-angle end. By contrast, if the upper limit of condition (2) is transgressed, the distance to the reflective surface RL is too long, which is undesirable for miniaturization.

From the viewpoint of the lens barrel structure, it is preferable to keep the fourth lens unit Gr4, i.e. the last lens unit, stationary as in the first embodiment (FIG. 1). Keeping the last lens unit stationary helps simplify the lens barrel structure. Moreover, it is preferable to perform focusing by moving the fourth lens unit Gr4. By performing focusing from infinity to a close-up distance by moving the fourth lens unit Gr4, it is possible to obtain satisfactory performance in close-up shooting.

In all embodiments, the zoom lens system is composed solely of refractive lens elements, which deflect incident light by refraction (i.e. lens elements of the type in which light deflects at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. In addition to the aperture stop ST, a beam restricting plate or the like may be disposed as required to shut off unnecessary light.

EXAMPLES

Hereinafter, practical examples of the construction and other features of zoom lens systems for use in image-sensing apparatuses embodying the invention will be presented with reference to their construction data and other data. Tables 1 to 3 show the construction data of Examples 1 to 3, respectively. Examples 1 to 3 correspond to the first to third embodiments described hereinabove. Thus, the lens construction diagrams (FIGS. 1 to 3) of the first to third embodiments also show the lens constructions of Examples 1 to 3, respectively.

In the construction data of each example, ri (i=1, 2, 3, ...) represents the radius of curvature (mm) of the i-th surface from the object side, di (i=1, 2, 3, ...) represents the i-th axial distance (mm) from the object side, and Ni (i=1, 2, 3, ...) and vi (i=1, 2, 3, ...) respectively represent the refractive index (Nd) for the d-line and the Abbe number (vd) of the i-th optical element from the object side. For each of those axial distances which vary during zooming, i.e. variable axial distances, three values are listed, namely, from left, the axial distance observed at the wide-angle end (shortest-focal-length end, W), the axial distance observed at the middle (middle-focal-length point, M), and the axial distance observed at the telephoto end (longest-focal-length end). Shown together with these data are the focal length (f, mm) of the taking lens system as a whole and the f-number (FNO) observed in those three different focal-length conditions W, M, and T. Table 4 shows the values of the conditional formulae as actually observed in Examples 1 to 3.

A surface of which the radius of curvature ri is marked with an asterisk (*) is an aspherical surface (a refractive optical surface having an aspherical shape, a surface that exerts a refractive effect equivalent to that of an aspherical surface, or the like). The surface shape of such an aspherical surface is defined by formula (AS) below. The aspherical surface data of the aspherical surfaces used in each example are also shown (except when Ai=0) together with the other data mentioned above.

$$X(H) = (C0 \cdot H^2)/(1+\sqrt{1-\epsilon \cdot C0^2 \cdot H^2}) + \Sigma(Ai \cdot H^i) \tag{AS}$$

where

X(H) represents the displacement along the optical axis AX at the height H (relative to the vertex);

H represents the height in a direction perpendicular to the optical axis AX;

C0 represents the paraxial curvature (=the reciprocal of the radius of curvature);

$\epsilon$ represents the quadric surface parameter; and

Ai represents the aspherical surface coefficient of i-th order.

FIGS. 4A to 4I, FIGS. 5A to 5I, and FIGS. 6A to 6I are aberration diagrams of Examples 1 to 3, respectively. Of these aberration diagrams, FIGS. 4A, 4B, 4C, 5A, 5B, 5C, 6A, 6B, and 6C show the aberrations observed at the wide-angle end W, FIGS. 4D, 4E, 4F, 5D, 5E, 5F, 6D, 6E, and 6F show the aberrations observed at the middle M, and FIGS. 4G, 4H, 4I, 5G, 5H, 5I, 6G, 6H, and 6I show the aberrations observed at the telephoto end T. Of these aberration diagrams, FIGS. 4A, 4D, 4G, 5A, 5D, 5G, 6A, 6D, and 6G show spherical aberration and sine condition, FIGS. 4B, 4E, 4H, 5B, 5E, 5H, 6B, 6E, and 6H show astigmatism, and FIGS. 4C, 4F 4I, 5C, 5F, 5I, 6C, 6F, and 6I show distortion, with Y' representing the maximum image height (mm). In the aspherical aberration diagrams, the solid line (d), dash-and-dot line (g), and dash-dot-dot line (c) represent the spherical aberration (mm) observed for the d-, g-, and c-lines, respectively, and the broken line (SC) represents the deviation (mm) from the sine condition to be fulfilled. In the astigmatism diagrams, the broken line (DM) and solid line (DS) represent the astigmatism (mm) observed for the d-line on the meridional and sagittal planes, respectively. In the distortion diagrams, the solid line represents the distortion (%) observed for the d-line.

As described above, according to the present invention, it is possible to realize an image-sensing apparatus provided with a compact zoom lens system with a zoom ratio of about 3× which offers satisfactory optical performance over the entire zoom range thereof. By applying the present invention to a digital camera, video camera, or camera incorporated in or externally fitted to a digital video unit, personal computer, mobile computer, cellular phone, personal digital assistant (PDA), or the like, it is possible to achieve miniaturization, cost reduction, higher zoom ratios, and higher performance in such apparatuses.

TABLE 1

Example 1
f = 5.06~8.86~14.27, FNO = 2.80~3.44~3.70

| Radius of Curvature | Axial Distance | Refractive Index | Abbe Number |
|---|---|---|---|
| (Gr1) | | | |
| r1 = 28.746 | d1 = 0.800 | N1 = 1.84666 | ν1 = 23.82 |
| r2 = 11.263 | d2 = 2.500 | | |
| r3 = ∞ | d3 = 8.830 | | |
| r4 = ∞ | d4 = 0.310 | | |
| r5 = 30.752 | d5 = 2.106 | N2 = 1.71300 | ν2 = 53.93 |
| r6 = −22.478 | d6 = 0.687~ 6.156~8.618 | | |
| (Gr2) | | | |
| r7* = −14.107 | d7 = 1.200 | N3 = 1.52200 | ν3 = 52.20 |
| r8* = 5.259 | d8 = 1.288 | | |
| r9 = 8.873 | d9 = 1.290 | N4 = 1.84666 | ν4 = 23.82 |
| r10 = 20.267 | d10 = 9.432~ 3.963~1.500 | | |
| (ST) | | | |
| r11 = ∞ | d11 = 5.966~ 3.864~0.680 | | |
| (Gr3) | | | |
| r12 = 9.500 | d12 = 1.904 | N5 = 1.75450 | ν5 = 51.57 |
| r13 = −534.205 | d13 = 0.100 | | |
| r14 = 6.161 | d14 = 4.853 | N6 = 1.48749 | ν6 = 70.44 |
| r15 = −9.351 | d15 = 0.010 | N7 = 1.51400 | ν7 = 42.83 |
| r16 = −9.351 | d16 = 0.800 | N8 = 1.84666 | ν8 = 23.82 |
| r17 = 4.704 | d17 = 0.880 | | |
| r18* = 5.109 | d18 = 1.465 | N9 = 1.52200 | ν9 = 52.20 |
| r19* = 9.626 | d19 = 1.013~ 3.114~6.298 | | |
| (Gr4) | | | |
| r20* = 8.380 | d20 = 1.448 | N10 = 1.52510 | ν10 = 56.38 |
| r21* = 86.865 | d21 = 0.900 | | |
| (PL) | | | |
| r22 = ∞ | d22 = 1.270 | N11 = 1.51680 | ν11 = 64.20 |
| r23 = ∞ | d23 = 0.600 | | |
| r24 = ∞ | d24 = 0.640 | N12 = 1.51680 | ν12 = 64.20 |
| r25 = ∞ | | | |

Aspherical Surface Data of Surface r7

$\epsilon = 1.0000$, $A4 = -0.17761897 \times 10^{-3}$, $A6 = 0.16277411 \times 10^{-4}$, $A8 = -0.52808932 \times 10^{-6}$, $A10 = 0.10291052 \times 10^{-7}$ Aspherical Surface Data of Surface r8

$\epsilon = 1.0000$, $A4 = -0.86595067 \times 10^{-3}$, $A6 = -0.18819405 \times 10^{-5}$, $A8 = -0.58863237 \times 10^{-6}$, $A10 = -0.32014095 \times 10^{-8}$ Aspherical Surface Data of Surface r18

$\epsilon = 1.0000$, $A4 = -0.78287551 \times 10^{-3}$, $A6 = 0.17275845 \times 10^{-3}$, $A8 = -0.44241975 \times 10^{-4}$, $A10 = 0.35649848 \times 10^{-5}$ Aspherical Surface Data of Surface r19

$\epsilon = 1.0000$, $A4 = 0.12463850 \times 10^{-2}$, $A6 = 0.45758902 \times 10^{-3}$, $A8 = -0.85119081 \times 10^{-4}$, $A10 = 0.64382229 \times 10^{-5}$ Aspherical Surface Data of Surface r20

$\epsilon = 1.0000$, $A4 = 0.83904492 \times 10^{-3}$, $A6 = -0.16809388 \times 10^{-4}$, $A8 = 0.59631770 \times 10^{-5}$ Aspherical Surface Data of Surface r21

$\epsilon = 1.0000$, $A4 = 0.12586026 \times 10^{-2}$, $A6 = -0.95770492 \times 10^{-4}$, $A8 = 0.10617913 \times 10^{-4}$

TABLE 2

Example 2
f = 5.06~8.86~14.37, FNO = 2.80~3.39~3.70

| Radius of Curvature | Axial Distance | Refractive Index | Abbe Number |
|---|---|---|---|
| (Gr1) | | | |
| r1 = 27.135 | d1 = 0.800 | N1 = 1.84666 | ν1 = 23.82 |
| r2 = 11.402 | d2 = 2.550 | | |
| r3 = ∞ | d3 = 9.300 | | |
| r4 = ∞ | d4 = 0.215 | | |
| r5 = 22.300 | d5 = 1.881 | N2 = 1.75450 | ν2 = 51.57 |
| r6 = −33.074 | d6 = 0.733~ 5.926~7.027 | | |
| (Gr2) | | | |
| r7* = −15.126 | d7 = 1.260 | N3 = 1.52200 | ν3 = 52.20 |
| r8* = 4.900 | d8 = 1.234 | | |
| r9 = 8.789 | d9 = 1.250 | N4 = 1.84666 | ν4 = 23.82 |
| r10 = 20.658 | d10 = 7.628~ 2.435~1.334 | | |
| (ST) | | | |
| r11 = ∞ | d11 = 7.265~ 5.006~0.680 | | |
| (Gr3) | | | |
| r12 = 13.178 | d12 = 1.606 | N5 = 1.80420 | ν5 = 46.50 |
| r13 = −46.160 | d13 = 0.100 | | |
| r14 = 6.395 | d14 = 4.573 | N6 = 1.48749 | ν6 = 70.44 |
| r15 = −13.997 | d15 = 0.010 | N7 = 1.51400 | ν7 = 42.83 |
| r16 = −13.997 | d16 = 0.800 | N8 = 1.84666 | ν8 = 23.82 |
| r17 = 4.871 | d17 = 1.069 | | |
| r18 = 9.339 | d18 = 1.657 | N9 = 1.48749 | ν9 = 70.44 |
| r19 = −74.209 | d19 = 0.800~ 3.291~8.599 | | |
| (Gr4) | | | |
| r20* = 13.370 | d20 = 1.514 | N10 = 1.52510 | ν10 = 56.38 |
| r21* = −23.620 | d21 = 2.065~ 1.833~0.850 | | |
| (PL) | | | |
| r22 = ∞ | d22 = 1.273 | N11 = 1.51680 | ν11 = 64.20 |
| r23 = ∞ | d23 = 0.600 | | |
| r24 = ∞ | d24 = 0.650 | N12 = 1.51680 | ν12 = 64.20 |
| r25 = ∞ | | | |

Aspherical Surface Data of Surface r7

$\epsilon = 1.0000$, $A4 = 0.14156785 \times 10^{-3}$, $A6 = -0.48834347 \times 10^{-5}$, $A8 = -0.95138192 \times 10^{-7}$, $A10 = 0.11109682 \times 10^{-7}$ Aspherical Surface Data of Surface r8

$\epsilon = 1.0000$, $A4 = -0.80793632 \times 10^{-3}$, $A6 = -0.20935607 \times 10^{-4}$, $A8 = -0.16351163 \times 10^{-5}$, $A10 = 0.29151223 \times 10^{-7}$ Aspherical Surface Data of Surface r20

$\epsilon = 1.0000$, $A4 = -0.16345142 \times 10^{-2}$, $A6 = 0.11768259 \times 10^{-3}$, $A8 = -0.99086438 \times 10^{-5}$ Aspherical Surface Data of Surface r21

$\epsilon = 1.0000$, $A4 = -0.11021266 \times 10^{-2}$, $A6 = 0.74446434 \times 10^{-4}$, $A8 = -0.76965344 \times 10^{-5}$

TABLE 3

Example 3
f = 5.96~10.43~16.99, FNO = 2.80~3.27~3.70

| Radius of Curvature | Axial Distance | Refractive Index | Abbe Number |
|---|---|---|---|
| (Gr1) | | | |
| r1 = 23.275 | d1 = 0.881 | N1 = 1.84666 | ν1 = 23.82 |
| r2 = 9.980 | d2 = 2.769 | | |

TABLE 3-continued

| | | | |
|---|---|---|---|
| r3 = ∞ | d3 = 10.401 | N2 = 1.84666 | v2 = 23.82 |
| r4 = ∞ | d4 = 0.103 | | |
| r5 = 20.077 | d5 = 2.432 | N3 = 1.72000 | v3 = 50.31 |
| r6 = −23.952 | d6 = 1.161~ 6.387~7.356 | | |
| (Gr2) | | | |
| r7* = −11.585 | d7 = 1.400 | N4 = 1.52200 | v4 = 52.20 |
| r8* = 5.500 | d8 = 1.200 | | |
| r9 = 9.247 | d9 = 1.500 | N5 = 1.84666 | v5 = 23.82 |
| r10 = 21.207 | d10 = 7.696~ 2.469~1.500 | | |
| (ST) | | | |
| r11 = ∞ | d11 = 9.427~ 7.308~1.801 | | |
| (Gr3) | | | |
| r12 = 10.631 | d12 = 2.589 | N6 = 1.77250 | v6 = 49.77 |
| r13 = 72.608 | d13 = 0.300 | | |
| r14 = 8.087 | d14 = 5.300 | N7 = 1.51680 | v7 = 64.20 |
| r15 = −12.634 | d15 = 0.012 | N8 = 1.51400 | v8 = 42.83 |
| r16 = −12.634 | d16 = 0.800 | N9 = 1.84666 | v9 = 23.82 |
| r17 = 7.916 | d17 = 1.293 | | |
| r18* = 7.700 | d18 = 1.600 | N10 = 1.52200 | v10 = 52.20 |
| r19* = 11.560 | d19 = 0.974~ 3.092~8.600 | | |
| (Gr4) | | | |
| r20* = 11.629 | d20 = 2.171 | N11 = 1.52510 | v11 = 56.38 |
| r21* = −24.582 | d21 = 1.884~ 1.885~1.884 | | |
| (PL) | | | |
| r22 = ∞ | d22 = 1.500 | N12 = 1.51680 | v12 = 64.20 |
| r23 = ∞ | d23 = 0.700 | | |
| r24 = ∞ | d24 = 0.770 | N13 = 1.51680 | v13 = 64.20 |
| r25 = ∞ | | | |

Aspherical Surface Data of Surface r7

$\epsilon = 1.0000, A4 = 0.36011741 \times 10^{-3}, A6 = -0.99065371 \times 10^{-5},$
$A8 = 0.29477060 \times 10^{-6}, A10 = -0.30718245 \times 10^{-8}$ Aspherical Surface Data of Surface r8

$\epsilon = 1.0000, A4 = -0.43694467 \times 10^{-3}, A6 = -0.14793021 \times 10^{-4},$
$A8 = -0.60980275 \times 10^{-6}, A10 = 080791992 \times 10^{-8}$ Aspherical Surface Data of Surface r18

$\epsilon = 1.0000, A4 = -0.12917823 \times 10^{-2}, A6 = 0.37798338 \times 10^{-5},$
$A8 = -0.94201723 \times 10^{-5}, A10 = 0.47099887 \times 10^{-6}$ Aspherical Surface Data of Surface r19

$\epsilon = 1.0000, A4 = -0.14154881 \times 10^{-3}, A6 = 0.21833230 \times 10^{-4},$
$A8 = -0.90987202 \times 10^{-5}, A10 = 0.46393310 \times 10^{-6}$ Aspherical Surface Data of Surface r20

$\epsilon = 1.0000, A4 = 0.36492034 \times 10^{-4}, A6 = 0.28412087 \times 10^{-4},$
$A8 = -0.11803703 \times 10^{-5}$ Aspherical Surface Data of Surface r21

$\epsilon = 1.0000, A4 = 0.12175110 \times 10^{-3}, A6 = 0.25056899 \times 10^{-4},$
$A8 = -0.12771007 \times 10^{-5}$

TABLE 4

| | Condition (1) fa/fW | Condition (2) D/fW |
|---|---|---|
| Example 1 | −4.415 | 1.525 |
| Example 2 | −4.700 | 1.581 |
| Example 3 | −3.571 | 1.559 |

What is claimed is:

1. An image-sensing apparatus comprising:

a zoom lens system for forming an optical image of an object with variable magnification, the zoom lens system including a plurality of lens units and achieving zooming by varying distances between the lens units; and an image sensor for converting the optical image formed by the zoom lens system into an electrical signal, wherein the zoom lens system comprises, from an object side thereof:

a first lens unit having a positive optical power and including a reflective member for turning an optical path, the first lens unit being kept stationary relative to the image sensor during zooming;

a second lens unit disposed on an image side of the first lens unit and having a negative optical power, the second lens unit being moved relative to the image sensor during zooming;

a third lens unit disposed on an image side of the second lens unit and having a positive optical power, the third lens unit being moved relative to the image sensor during zooming; and a fourth lens unit disposed on an image side of the third lens unit and having a positive optical power, wherein the zoom lens system fulfills the following conditions:

$1.0 < D/fW < 3.0$; and $-8 < fa/fW < -3$ where

D represents an axial distance from a most object-side surface of the first lens unit to the reflective surface of the reflective member;

fa represents a composite focal length of all optical elements disposed on an object side of the reflective member within the first lens unit; and fW represents a focal length of the zoom lens system as a whole at an wide-angle end.

2. An image-sensing apparatus as claimed in claim 1, wherein the first lens unit has, from an object side thereof, a first lens element having a negative optical power and a reflective surface.

3. An image-sensing apparatus as claimed in claim 1, wherein the zoom lens system achieves focusing by moving the fourth lens unit.

4. A camera comprising:

an image-sensing apparatus for outputting an electric image signal representing an image of an object, wherein the image-sensing apparatus comprises:

a zoom lens system for forming an optical image of an object with variable magnification, the zoom lens system including a plurality of lens units and achieving zooming by varying distances between the lens units; and an image sensor for converting the optical image formed by the zoom lens system into an electrical signal, the zoom lens system comprising, from an object side thereof:

a first lens unit having a positive optical power and including a reflective member for turning an optical path, the first lens unit being kept stationary relative to the image sensor during zooming;

a second lens unit disposed on an image side of the first lens unit and having a negative optical power, the second lens unit being moved relative to the image sensor during zooming;

a third lens unit disposed on an image side of the second lens unit and having a positive optical power, the third lens unit being moved relative to the image sensor during zooming; and a fourth lens unit disposed on an image side of the third lens unit and having a positive optical power, wherein the zoom lens system fulfills the following conditions:

$1.0 < D/fW < 3.0$; and $-8 < fa/fW < -3$ where

D represents an axial distance from a most object-side surface of the first lens unit to the reflective surface of the reflective member;

fa represents a composite focal length of all optical elements disposed on an object side of the reflective member within the first lens unit; and fW represents a focal length of the zoom lens system as a whole at an wide-angle end.

* * * * *